United States Patent [19]
Traub et al.

[11] 3,909,016
[45] Sept. 30, 1975

[54] SEAL ASSEMBLY WITH PIVOTABLE SLIPPER SEAL

[75] Inventors: Henry A. Traub, Pacific Palisades; Isiah Sherman Gauley, Westlake Village, both of Calif.

[73] Assignee: W. S. Shamban & Co., West Los Angeles, Calif.

[22] Filed: Dec. 26, 1973

[21] Appl. No.: 427,937

[52] U.S. Cl.............................. 277/165; 277/176
[51] Int. Cl............................... F16j 15/24
[58] Field of Search.... 277/165, 176, 138, 168–172; 92/185, 188

[56]  References Cited
UNITED STATES PATENTS
2,708,573  5/1955  Rouoldt ............................. 277/165

FOREIGN PATENTS OR APPLICATIONS
673,966  2/1963  Canada .............................. 277/165

Primary Examiner—Robert I. Smith
Attorney, Agent, or Firm—George F. Smyth

[57]  ABSTRACT

A seal assembly comprising a slipper seal and a resilient member for loading the slipper seal against the surface to be sealed. The slipper seal has first and second peripheral surfaces. The first peripheral surface has first and second sections defining a corner which is engageable with the surface to be sealed. The slipper seal is pivotable generally about such corner to convert the corner into a relatively narrow sealing ridge which is sealingly engageable with the surface to be sealed.

13 Claims, 4 Drawing Figures

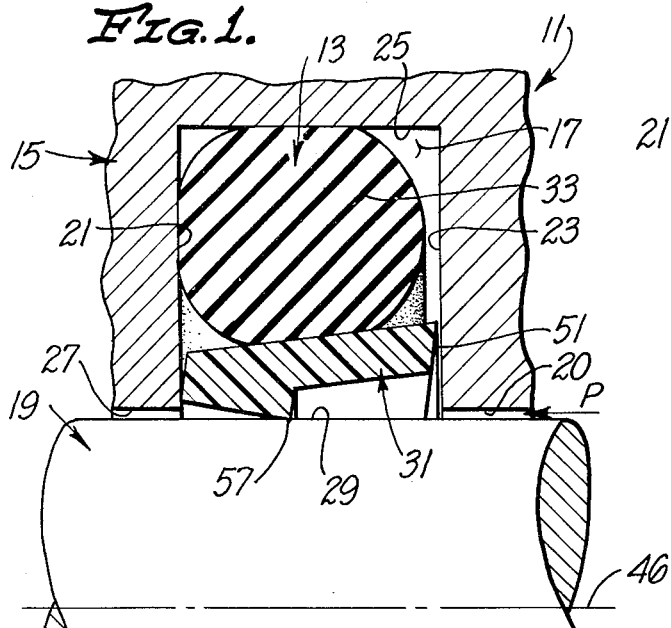
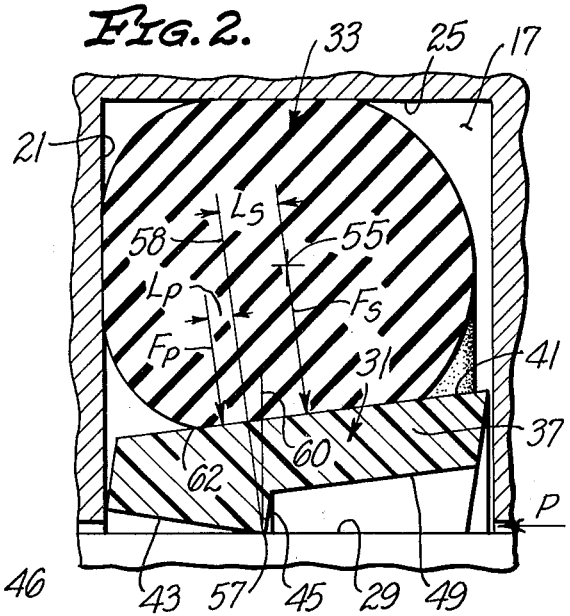
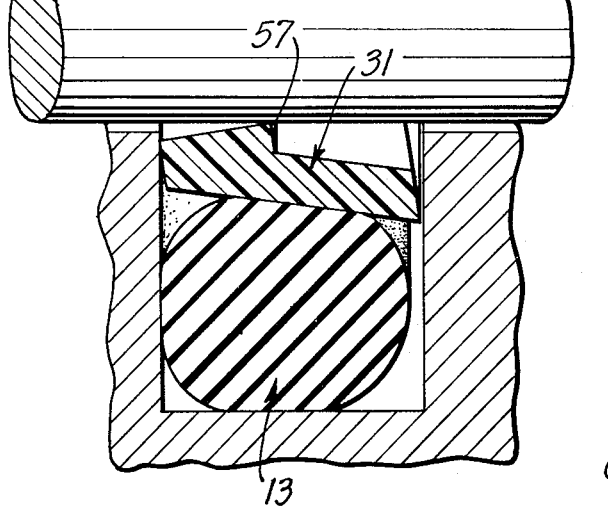
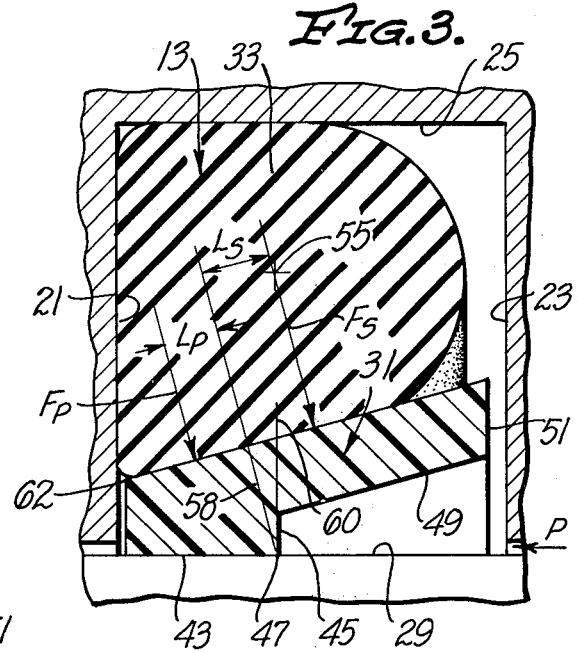
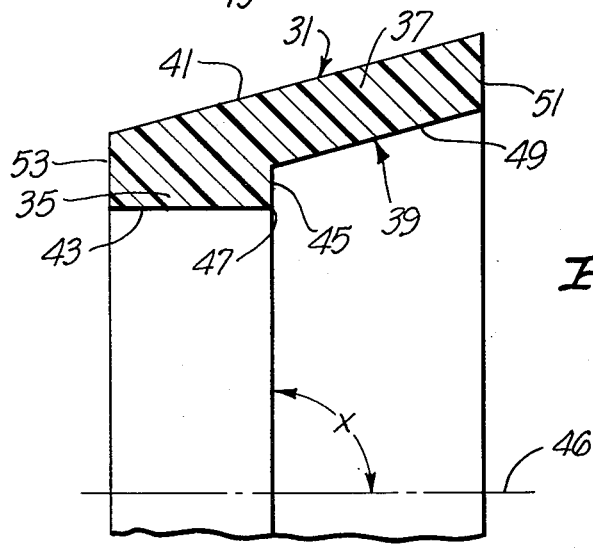

SEAL ASSEMBLY WITH PIVOTABLE SLIPPER SEAL

BACKGROUND OF THE INVENTION

For many applications, seal assemblies must not allow any leakage. For example, zero leakage may be required for systems where no make-up fluid is available.

Zero leakage is difficult to obtain under any circumstances; however, it is even more difficult when the seal assembly is subjected alternately to high and low fluid pressures. For example, pressures below 150 psi may be considered low pressure. The reason is that a seal which has good sealing characteristics at high pressure may not function satisfactorily at low pressures and vice versa.

A dynamic seal assembly, i.e., one loaded by the fluid pressure, makes a good high pressure seal. A dynamic seal assembly may include a slipper seal and a resilient member such as a resilient seal. the resilient seal is compressed to load the slipper seal against the surface to be sealed. In addition, the resilient seal is exposed to the fluid under pressure against which the seal is operating. The fluid under pressure further compressively loads the resilient seal, and this causes a still greater loading of the slipper seal against the surface to be sealed. Consequently, as fluid pressure increases, the slipper seal is progressively more tightly loaded against the surface to be sealed, and for this reason a dynamic seal assembly has excellent high pressure sealing characteristics.

Unfortunately, some leakage may occur at relatively low pressure because the dynamic loading of the resilient seal is then at a minimum. In an effort to solve the low pressure leakage problem, a relatively narrow ridge can be formed on the slipper seal. The ridge engages the surface to be sealed and because the ridge is narrow, the unit loading is relatively high. This construction initially improves the low pressure sealing effectiveness; however, sealing effectiveness at low pressures progressively decreases with use of the seal assembly.

SUMMARY OF THE INVENTION

This invention is based, in part, upon the recognition of some of the factors which cause a seal assembly of this type to lose its sealing effectiveness at low pressures after a period of use. Specifically, a slipper seal formed with a ridge for beneficial low pressure sealing characteristics tends to cold flow at high fluid pressures as a result of the dynamic loading thereof. Under high fluid pressures, the ridge and the adjacent portions of the slipper seal are grossly distorted. When the high pressure diminishes, the recovery of the slipper seal may be less than complete, i.e., some of the deformation may be permanent. This causes an increase in the area between the slipper seal and the surface to be sealed with the consequent reduction in unit loading and loss of sealing effectiveness. In addition, the resilient seal may not return to the preferred location when low pressure conditions return.

One feature of this invention is the provision of a slipper seal having a sealing ridge which is not destroyed during use. The sealing ridge does not exist at high pressure and does exist whenever the seal assembly is subjected to low pressure conditions. However, the creation and elimination of the sealing ridge as pressure conditions change, does not result in permanent destruction of the sealing ridge. In other words, the creation and elimination of the sealing ridge in response to pressure conditions occurs naturally and without the application of destructive forces to the slipper seal.

The sealing ridge can be created by converting a corner of the slipper seal into the sealing ridge. The sealing ridge has a relatively narrow region of contact with the surface to be sealed so that unit loading of the sealing ridge against the surface to be sealed can be relatively high.

These advantageous results can be obtained by providing a slipper seal which has a first peripheral surface which in turn has first and second sections defining a corner. The corner circumscribes the surface to be sealed. The slipper seal is pivotable generally about such corner between a high pressure position in which the first section of the peripheral surface is engageable with the surface to be sealed along at least a portion of its length, and a low pressure position in which the first section is engageable with the surface to be sealed along a lesser portion of the length of the first section. This pivoting action of the slipper seal converts the corner into a relatively narrow sealing ridge which is sealingly engageable with the surface to be sealed.

The first section of the first peripheral surface preferably extends in a substantially straight line as viewed in axial cross section in the unstressed condition of the slipper seal. The first section is engageable with the surface to be sealed along the full length of the first section in the high pressure position. The slipper seal has an end face on the side of the corner opposite from the direction in which fluid pressure is applied to the seal assembly. The first section is the only portion of the first peripheral surface between the corner and the end face which engages the surface to be sealed in the high pressure position. Accordingly, as the slipper seal pivots toward the high pressure position, there are no undercuts or voids in the first peripheral surface which permit cold flow of the slipper seal, and thus there is no tendency to destroy the ridge in the high pressure position. In other words, the first section of the first peripheral surface naturally conforms to the surface to be sealed merely upon being moved to the high pressure position. If the first section of the first peripheral surface were notched or otherwise uneven, it could not conform to the relatively smooth surface to be sealed without being substantially radially distorted.

The first and second sections preferably intersect to form a relatively sharp corner. A sharp corner serves as a wiper, and in addition provides a sharp sealing ridge under low pressure conditions.

Although the first section may extend radially somewhat, it preferably extends in a generally axial direction. As the radial component to the first section increases, the likelihood that the slipper seal will undergo permanent deformation under high pressure increases. To assure a sharp corner for wiping purposes, the second section preferably forms an angle of at least 90° with the axis of the seal assembly which angle opens generally in the direction from which the fluid pressure is applied to this seal assembly. The first and second sections form an included angle at the corner of no greater than about 90°.

The present invention also provides a motive force for pivoting the slipper seal under low pressure conditions. Although separate pivoting means could be provided, the present invention utilizes the resilient member to provide the force for pivoting the slipper seal.

In a typical prior art construction, the resilient member is squeezed radially between the slipper seal and one wall of the seal groove. As a result of this radial squeeze, a resultant static force acts against the slipper seal to load the sealing ridge against the surface to be sealed. In prior art constructions this resultant static force acts directly through the sealing ridge. This assures that the maximum force resulting from compressively loading the resilient member will act on the sealing ridge. The present invention departs from conventional practice in causing the resultant static force not to pass through the sealing ridge. This enables the resilient member via the resultant static force to create a torque or couple on the slipper seal about the corner to pivot the slipper seal and convert the corner into a sealing ridge.

The resultant static force preferably should extend in a direction to eliminate the possibility of a fluid wedge getting between the ridge and the surface to be sealed as a result of pivoting the slipper seal. The torque produced by the resultant static force should be the minimum necessary for converting the corner into the sealing ridge under low pressure conditions.

The direction in which the resultant static force acts can be controlled in various ways. For example, the direction of the resultant static force can be changed by changing the axial position of the sealing ridge relative to the other parts of the slipper seal and/or changing the slope of the surface of the slipper seal which is engaged by the resilient member.

In pivoting, the slipper seal is torsionally distorted. Accordingly, the slipper seal must be constructed of a material which can be distorted in this manner. However, the torsional distortion of the slipper seal does not result in cold flow or permanent deformation of the slipper seal.

The cross sectional configuration of the slipper seal, in addition to providing the corner, must also provide a supporting surface for the resilient member and allow pivoting of the slipper seal. To accomplish this, the slipper seal can advantageously include a rib and a flange integral with the rib and projecting generally axially thereof in the direction from which pressure is applied to the seal assembly. The flange provides at least a portion of the necessary supporting surface for the resilient member. The flange is also radially spaced from the surface to be sealed at least under high pressure conditions so that the flange will not serve as a stop for preventing pivotal movement of the slipper seal of the type which converts the corner into the sealing ridge.

Under high pressure sealing conditions, this relationship between the resultant static force and the corner will be shifted; however, this does not affect the sealing effectiveness of the seal under high pressure conditions.

In order to assure that the resultant static force of the resilient member is in the proper axial relationship relative to the corner under low pressure conditions, the slipper seal is provided with a second peripheral surface which is inclined in axial cross section. One function of the incline of the second peripheral surface is that it cams or urges the resilient member toward one end of the groove in which the seal assembly is positioned. Thus, the position of the resilient member under low pressure conditions can be accurately predicted. Preferably, the second peripheral surface slopes radially toward the rib as it extends from the free end of the flange axially toward the rib. This is opposite to the direction in which the incline might normally be expected to extend, in that under high pressure conditions, the dynamic pressure forces the resilient member axially into a region of progressively radially increasing dimensions.

The invention can best be understood by reference to the following description taken in connection with the accompanying illustrative drawing.

BRIEF DESCRIPTION OF THE DRAWING

FIG. 1 is a fragmentary, sectional view taken on an axial plane and illustrating one form of seal construction of this invention with relatively low pressure being applied thereto.

FIG. 2 is a fragmentary, sectional view on a larger scale of one portion of the seal construction shown in FIG. 1.

FIG. 3 is a fragmentary, sectional view similar to FIG. 2 with the seal assembly being loaded by fluid under high pressure.

FIG. 4 is a fragmentary, axial, sectional view of a slipper seal constructed in accordance with the teachings of this invention.

DESCRIPTION OF THE PREFERRED EMBODIMENT

FIG. 1 shows a seal construction 11 which includes an annular seal assembly 13, an outer member 15 having an annular seal groove 17 in which the seal assembly 13 is mounted, and an inner member 19. Fluid under pressure is applied to the seal assembly 13 in the direction of the arrow P. The fluid passes through an annular clearance space 20 and acts directly on the seal assembly 13. It should be understood that the members 15 and 19 are merely illustrative of one environment in which the seal assembly 13 can be advantageously utilized. In the embodiment illustrated, the members 15 and 19 are suitably mounted for relative axial and/or rotational movement.

Although the outer member 15 could be of various different configurations, in the embodiment illustrated, it includes axially spaced, radially extending walls 21 and 23 interconnected by an axial wall 25 to define the seal groove 17. The seal groove 17 completely circumscribes the inner member 19. In the embodiment illustrated, the seal groove 17 is generally rectangular in axial cross section. The outer member 15 has a passage 27 extending therethrough in which the inner member 19 is positioned.

The inner member 19 can be of various different configurations; however, in the embodiment illustrated, it is in the form of a cylindrical shaft. The inner member 19 has a cylindrical outer surface 29 which defines one of the surfaces to be sealed.

The seal assembly 13 includes a slipper seal 31 and an annular resilient member which, in the embodiment illustrated, is in the form of an O-ring 33. The slipper seal 31 isolates the O-ring 33 from rubbing contact with the surface 29 and forms a sliding fit with the surface 29. The slipper seal 31 can be constructed of any of the materials commonly used for such purpose. For example, a suitable plastic material such as a fluoroplastic may be used. Polytetrafluoroethylene is one example of a fluoroplastic which can be utilized.

The construction of the slipper seal 31 can best be understood with reference to FIG. 4 which shows the slipper seal in a relaxed or unstressed condition. Generally, the slipper seal 31 is of an annular configuration and includes a rib 35 and a flange 37 integral with the rib. The slipper seal 31 has an inner peripheral surface 39 and an outer peripheral or circumferential surface 41. The inner peripheral surface 39 has a first section or peripheral sealing surface 43 and a second section 45, both of which are on the rib 35. In the embodiment illustrated, the first section 43 is cylindrical and coaxial with the axis 46 (FIG. 1) of the seal assembly 13. Similarly, the second section 45 is annular and extends radially. The sections 43 and 45 intersect to define a corner 47 which completely circumscribes the inner member 19.

The first section 43 need not be cylindrical and the second section 45 need not extend perfectly radially. However, any incline on the first section 43 should be relatively minor. However, a 10° slope on the first section 43 may be allowable. Preferably, the angle $\chi$ (FIG. 4) defined by the second section 45 and the axis 46 of the seal assembly 13 should be at least 90° in the relaxed condition of the slipper seal 31. The section 45 may, however, slope axially to the left to increase the angle $\chi$. By observing these parameters, the corner 47 will be relatively sharp and capable of serving as a wiper.

The inner peripheral surface 39 has a third section or circumferential surface 49 which is frusto-conical and which extends radially inwardly as it extends axially from the free end 51 of the flange 37 axially toward the rib 35. While it is not important that the third section 49 be configured in this manner, it is important that the third section 49 be radially spaced from the surface 29 at least when high fluid pressures are applied to the seal assembly 13 (FIG. 3).

The outer peripheral surface 41 is frustoconical and is inclined radially inwardly as it extends from the free end 51 toward the rib 35. Although the slopes of the surface 41 and the third section 49 may be different, in the embodiment illustrated, these surfaces are parallel to each other as viewed in axial cross section. This facilitates the construction of the slipper seal 31 in that it causes the flange 37 to be of constant radial thickness throughout its full length.

The slipper seal 31 has an annular surface or end face 53 which extends radially and which defines the other end of the slipper seal. Although the annular surface 53 may be of different configurations, construction of the slipper seal can be simplified by employing the configuration shown in FIG. 4.

The O-ring 33 is constructed of a resilient deformable material such as an elastomer. Although the O-ring 33 is shown, it should be understood that other resilient members can be utilized in lieu of the O-ring. For example, an elastomeric ring having a noncircular cross section configuration may be used.

The slipper seal 31 and the O-ring 33 can be loaded into the seal groove 17 as shown in FIGS. 1 and 2. When so positioned, the O-ring 33 is radially compressively loaded between the axial wall 25 and the outer peripheral surface 41. This causes the O-ring 33 to exert a resultant static force $F_s$ inwardly against the slipper seal 31 in a direction perpendicular to the outer peripheral surface 41. The force $F_s$ is generated solely by radially compressively loading of the O-ring 33 and is not the result of fluid pressure acting on the seal assembly 13. The incline of the outer peripheral surface 41 urges the O-ring 33 axially to the left and into engagement with the radially extending wall 21.

The O-ring 33 has a center of pressure 55 which is centrally located in the O-ring in the radial direction and through which the force $F_s$ acts. The force $F_s$ performs two important functions. First, it loads the slipper seal 31 radially inwardly against the surface 29 to provide a low pressure seal. Second, the force $F_s$ pivots the slipper seal 31 clockwise from the position shown in FIG. 4 to the low pressure position shown in FIG. 2. This has the effect of converting the corner 47 into a sealing ridge 57.

The force $F_s$ is offset generally axially a distance $L_s$ from a reference line 58 which is perpendicular to the outer peripheral surface 41 and which passes through the sealing ridge 57. The force $F_s$ acting through the distance $L_s$ tends to pivot the slipper seal 31 to the low pressure position shown in FIG. 2. The slipper seal 31 is torsionally distorted as a result of being pivoted to the low pressure position shown in FIG. 2. The radial spacing between the flange 37 and the surface 29 allows this pivoting movement of the slipper seal 31 to occur. The condition of the seal assembly 13 shown in FIG. 2 is maintained at no pressure and under low pressure conditions.

Assuming that some fluid under pressure is acting in the direction of the arrow P on the righthand face of the seal assembly 13, there will be a resultant dynamic force $F_p$ acting inwardly against the slipper seal 31 in a direction perpendicular to the outer peripheral surface 41. The force $F_p$ is generated solely by the dynamic loading of the seal assembly 13 and is not the result of static radial compression of the O-ring 33. Thus, the forces $F_s$ and $F_p$ are mutually exclusive. The force $F_p$ is offset generally axially a distance $L_p$ from the reference line 58. From FIG. 2, it is apparent that the forces $F_s$ and $F_p$ generate oppositely directed couples about the sealing ridge 57. Under relatively low pressure conditions, $F_s \times L_s$ is sufficiently greater than $F_p \times L_p$ to overcome the torsional resistance of the slipper seal 31 to pivot the slipper seal to the low pressure position shown in FIG. 2.

It is important to control the direction in which the resultant forces $F_s$ and $F_p$ act. One or more of a variety of known ways to change the direction of a resultant force can be utilized. For example, the forces $F_s$ and $F_p$ act perpendicular to the surface 41, and accordingly a change in the slope of this surface would result in a change in the direction of the forces $F_s$ and $F_p$. Secondly, the distances $L_s$ and $L_p$ can be changed by moving of the corner 47, i.e., by moving of the pivot point. Thirdly, the location of the force $F_s$ can be changed by changing the size and/or the shape of the O-ring 33.

In the specific example shown in FIG. 2, the reference line 60 separates the rib 35 from the flange 37. The dynamic forces on the flange 37 are balanced because the surface 41, the section 49 and the O-ring 33 are subject to the same fluid pressure. Thus, the resultant force $F_p$ acts to the left of the reference line 60 and will lie approximately half way between the reference line 60 and a line 62 (FIG. 2) along which the O-ring 33 separates from the surface 41.

In the low pressure position shown in FIG. 2, the first section 43 is tilted substantially out of contact with the surface 29 except at the ridge 57. The section 45 is also pivoted clockwise from the position shown in FIG. 4; however, the ridge 57 still is sharp enough in the direction facing the applied pressure P to form a wiper. Because the only portion of the slipper seal 31 to engage the surface 29 is the narrow sealing ridge 57, the unit loading of the sealing ridge against the surface 29 is relatively high. This materially contributes to excellent low pressure sealing characteristics.

If the seal assembly 13 is subjected to fluid under high pressure, the fluid passes between the free end 51 and the radially extending wall 23 to urge the O-ring 33 to the left from the position shown in FIG. 2 toward the position shown in FIG. 3. In addition, fluid under pressure acts on the sections 45 and 49. The overall effect is the counterclockwise pivoting of the slipper seal 31 about the sealing ridge 57 from the low pressure position shown in FIG. 2 to the high pressure position shown in FIG. 3. This converts the sealing ridge 57 into the corner 47.

The presence of high fluid pressure changes the net torque acting on the slipper seal 31. First, the force $F_p$ increases in proportion to the increase in fluid pressure, and this increases the torque tending to pivot the slipper seal 31 to the high pressure position. Second, the O-ring 33 is forced axially to the left to the position shown in FIG. 3. This moves the center of pressure 55 to the left to reduce the dimension $L_s$ relative to what it would be if the center of pressure were not moved. Movement of the O-ring 33 to the left also moves the line 62 to the left and increases the distance $L_p$ to thereby further increase the torque tending to pivot the slipper seal 31 to the high pressure position. Accordingly, the forces $F_s$ and $F_p$ remain perpendicular to the outer peripheral surface 41. Pivoting of the slipper seal 31 and of the outer peripheral surface 41 results in a change in direction of the forces $F_s$ and $F_p$.

It will be appreciated that the effects described above will occur when the fluid pressure acting on the seal assembly 13 is being increased. Similarly, upon the recurrence of low pressure conditions, the O-ring 33 pivots the slipper seal 31 to the low pressure position. Although the forces $F_s$ and $F_p$ and the distances $L_s$ and $L_p$ have been analyzed herein in a single plane, it will be apparent that this force analysis is typical for all axial planes of the seal assembly 13.

During high pressure conditions, the slipper seal 31 is substantially nondistorted in that it is returned to substantially the same configuration it assumes in the relaxed condition. Accordingly, the sections 43 and 45 and the ridge 57 are not subjected to rapid wear or permanent deformation by the high pressure. In fact, any wear of the surface section 43 at the corner 47 would tend to sharpen this corner.

When the high pressure subsides, the inherent resilience of the O-ring 33 tends to return it to the low pressure position shown in FIGS. 1 and 2. Because of the incline of the peripheral surface 41, the location of the O-ring 33 is accurately predictable. This increases the distance $L_s$ sufficiently to cause clockwise pivotal movement of the slipper seal 31 about the corner 47 to convert the latter into the narrow sealing ridge 57.

With the construction illustrated, the slipper seal 31 is distorted only when it is subjected to relatively low pressures which are incapable of permanently distorting the slipper seal. Conversely, when the slipper seal 31 is subjected to relatively high pressures, it is substantially undistorted in that it assumes the same configuration that it assumes in the relaxed condition.

Obviously, the pressure levels at which the slipper seal 31 begins pivoting from the low pressure position to the high pressure position and from the high pressure position to the low pressure position can be varied by those having ordinary skill in the art. Accordingly, use herein of the expressions "low fluid pressure" and "high fluid pressure" is merely descriptive of relative pressure levels and should not be taken to mean any specific pressure levels. In the embodiment illustrated, the configuration of the slipper seal 31 in the relaxed condition is substantially identical to the configuration of the slipper seal in the high pressure position. However, the slipper seal 31 may have other configurations in the relaxed condition. For example, the slipper seal 31 in the relaxed condition may have the configuration which it assumes in the low pressure position, in which event, the slipper seal would be slightly torsionally distorted in the high pressure position.

Although the seal groove 17 is shown as being defined by the outer member 15, it will be understood that the seal groove may be provided in the inner member 19. In this event, the seal assembly 13 would be mounted on the inner member 19 and the sealing ridge 57 would be formed on the outer periphery of the seal assembly rather than on the inner periphery as shown in the illustrated embodiment.

Although an exemplary embodiment of this invention has been shown and described, many changes, modifications and substitutions may be made by those with ordinary skill in the art without necessarily departing from the spirit and scope of this invention.

We claim:

1. A seal assembly for use between inner and outer relatively movable members wherein the seal assembly is subjected to fluid under first and second fluid pressure levels which act in a first direction against the seal assembly, said first pressure level being less than said second pressure level, said seal assembly comprising:

a slipper seal adapted to circumscribe a region of the inner member and including an annular rib and an axially extending flange integral with said rib;

said rib having a peripheral sealing surface and said flange having first and second peripheral surface sections spaced radially from the peripheral sealing surface in a relaxed condition of said slipper seal;

said rib having an annular surface which is generally transverse to the axis of said peripheral sealing surface, said annular surface extending generally between said peripheral sealing surface and said first peripheral surface section, said annular surface and said peripheral sealing surface defining an annular corner of said rib;

said slipper seal being pivotable generally about said corner between a high pressure position in which a first section of the peripheral sealing surface is engageable with the inner member along at least a portion of the length of said first section and a low pressure position in which the first section is engageable with the inner member along a lesser portion of the length of said first section and said corner is converted into a relatively narrow sealing ridge which is sealingly engageable with the inner member;

a resilient member spaced radially outwardly from said inner member by said slipper seal and at least partially circumscribing the inner member and contacting the second peripheral surface which is spaced from said inner member, said resilient member being squeezable radially between the second peripheral surface and the other of said members to apply a resultant static force to said slipper seal which tends to pivot said slipper seal to the low pressure position; and the exposure of the seal assembly to said second fluid pressure level providing a resultant dynamic force which acts against said slipper seal to pivot the slipper seal to the low pressure position.

2. A seal assembly as defined in claim 1 wherein said second peripheral surface is inclined relative to the axis of the seal assembly.

3. A seal assembly as defined in claim 1 wherein said second peripheral surface is inclined radially toward said first section as it extends in said first direction.

4. A seal assembly as defined in claim 1 wherein said first and second sections form an included angle at said corner of no greater than about 90°.

5. A seal assembly as defined in claim 1 wherein said slipper seal includes annular end faces whose cross-sectional dimension is less than the cross-sectional dimension as measured between the corner of said rib and the second peripheral surface section.

6. A seal assembly as defined in claim 1 wherein said first section of said first peripheral sealing surface extends in a substantially straight line as viewed in axial cross section in the unstressed condition of said slipper seal, said first section being engageable with the inner member along the full length of said first section in the high pressure position, said slipper seal having an end face, said first section being the only portion of said first peripheral sealing surface between said corner and said end face which is engageable with the inner member in said high pressure position.

7. A seal assembly for use between inner and outer relatively movable members wherein the seal assembly is subjected to fluid under first and second fluid pressure levels which act in a first direction against the seal assembly, said first pressure level being less than said second pressure level, said seal assembly comprising:

a slipper seal adapted to circumscribe a region of the inner member and including an annular rib and an axially extending flange integral with said rib;

said rib having a peripheral sealing surface and said flange having first and second peripheral surface sections spaced radially fromthe peripheral sealing surface in a relaxed condition of said slipper seal;

said rib having an annular surface which is generally transverse to the axis of said peripheral sealing surface, said annular surface extending generally between said peripheral sealing surface and said first peripheral surface section, said annular surface and said peripheral sealing surface defining an annular corner of said rib;

said slipper seal being pivotable generally about said corner between a high pressure position in which a first section of the peripheral sealing surface is engageable with said one member along at least a portion of the length of said first section and a low pressure position in which the first section is engageable with said one member along a lesser portion of the length of said first section and said corner is converted into a relatively narrow ealing ridge which is sealingly engageable with said one member; and means positioned radially or said one member and in contact with said second peripheral surface and responsive to the first pressure level for pivoting the slipper seal to the low pressure position and responsive to the second pressure level for pivoting the slipper seal to the high pressure position.

8. A slipper seal comprising:

an annular rib having a low friction peripheral sealing surface;

a flange integral with said annular rib, said flange projecting generally axially of said rib and terminating in a free end, said flange and rib being integrally constructed of plastic material said flange having first and second peripheral surface sections both of which are displaced radially from the peripheral sealing surface in a relaxed condition of the slipper seal;

said rib having an annular surface which is generally transverse to the axis of said peripheral sealing surface, said annular surface extending generally between said peripheral sealing surface and said first peripheral surface section, said annular surface and said peripheral sealing surface defining an annular corner of said rib; and said second peripheral surface section being inclined in axial cross section so that it extends axially and radially toward said rib as it extends in the direction from said free end toward said rib.

9. A slipper seal as defined in claim 8 wherein said first peripheral surface section extends from said free end of the flange axially and radially toward said rib.

10. A slipper seal as defined in claim 8 wherein said first and second peripheral surface sections are generally parallel and said rib and the slipper seal terminate at the end remote from said free end in an annular surface which is substantially perpendicular to the axis of said cylindrical sealing surface, said peripheral sealing surface and said annular surface defining an included angle of no more than about 90°.

11. A seal construction which is subjected to high and low fluid pressure conditions comprising:

outer and inner relatively movable members, said outer member circumscribing the inner member;

one of said members having first and second radially extending walls and an axial wall intersecting the radial walls to define a seal groove opening toward the other of said members, the fluid pressure being applied in the direction for the first radially extending wall toward the second radially extending wall;

a slipper seal in said groove and circumscribing said inner member, said slipper seal including a rib and a flange;

said rib having first and second surface sections defining a corner of said rib, said corner circumscribing the inner member and engaging the other of the members;

said slipper seal being pivotable generally about said corner between a high pressure position in which the first surface section of the rib is engageable with said other member along at least a portion of the length of said first surface section and a low pressure position in which the first surface section is engageable with said other member along a lesser portion of the length of said first surface section and said corner is converted into a relatively narrow sealing ridge which sealingly engages said other member;

said flange extending from said rib in a direction having an axial component toward said first radially extending wall, said flange having a first circumferential surface which is spaced radially at least under high pressure conditions from said other member;

said slipper seal having a second circumferential surface which faces generally toward said axial wall of said seal groove;

a resilient member in said seal groove, said resilient member being radially compressively loaded between said second circumferential surface and said axial wall to thereby apply a resultant static force to said slipper seal to load said ridge against said other member, said resilient member at least substantially circumscribing said inner member;

said resultant static force acting in a direction to create a torque tending to pivot said slipper seal in to said low pressure position; and the exposure of said slipper seal and resilient member to high fluid pressure conditions providing a resultant dynamic force which acts against said slipper seal to pivot the slipper seal to the low pressure position.

12. A seal construction as defined in claim 11 wherein said resilient member includes an elastomeric ring and at least a substantial portion of said circumferential surface is inclined in axial cross section so that it extends radially toward said other member as it extends from said first radially extending wall toward said second radially extending wall, said first and second surface sections forming an included angle of no more than about 90°, and said second surface section extending generally radially and forming an angle of at least about 90° with the axis of the seal construction as viewed in axial cross section, said last mentioned angle opening toward said first radially extending wall.

13. A seal construction as defined in claim 12 wherein said flange terminates in a free end to define one end of said slipper seal, the other end of said slipper seal being defined by an annular surface which extends generally radially, said first surface section terminating substantially at said last mentioned radial surface.

* * * * *